United States Patent [19]

Endo et al.

[11] Patent Number: 5,015,710
[45] Date of Patent: May 14, 1991

[54] PROCESS FOR PRODUCING A BLENDED METATHESIS/RADICAL POLYMER COMPOSITION

[75] Inventors: Zenichiro Endo; Shigeyoshi Hara, both of Iwakuni, Japan

[73] Assignee: Hercules Incorporated, Wilmington, Del.

[21] Appl. No.: 589,281

[22] Filed: Sep. 27, 1990

[51] Int. Cl.$^5$ .................... C08F 36/00; C08F 136/00; C08F 236/00; C08F 4/44
[52] U.S. Cl. ...................................... 526/283; 526/77; 526/137; 526/271
[58] Field of Search .................. 526/283, 77, 137, 271

[56] References Cited
U.S. PATENT DOCUMENTS
4,481,344 11/1984 Newburg ........................... 526/283

OTHER PUBLICATIONS

Oshika, T. and Tabuchi, H., Bulletin of the Chemical Society of Japan, 41, 211–217 (1968).

Primary Examiner—Joseph L. Schofer
Assistant Examiner—Fred Zitomer
Attorney, Agent, or Firm—William S. Alexander

[57] ABSTRACT

A process is disclosed for preparing a blend of a metathesis polymer and a radical polymer wherein a norbornene polymer is metathesis polymerized in the presence of a vinyl compound having two double bonds in conjugated relationship. Also included in the system is a compound capable of being reduced to a radical by the reduced valence transition metal element which serves as the catalyst of the metathesis polymerization. Examples of such compounds are specific chlorinated organic and chlorinated inorganic compounds.

28 Claims, No Drawings

PROCESS FOR PRODUCING A BLENDED METATHESIS/RADICAL POLYMER COMPOSITION

FIELD OF THE INVENTION

The present invention relates to a method for improving a molded polymer article produced by the simultaneous polymerization and molding of a metathesis polymerizable monomer in the presence of a metathesis polymerization catalyst. More particularly, the invention relates to a method for forming an interpenetrating network (IPN) composed of a mixture of a metathesis polymer and a radical polymer by the radical polymerization of a vinyl monomer taking advantage of the fact that a compound used as an agent for reducing the residual monomer in a metathesis polymerization system forms a redox system with a transition metal of a metathesis polymerization catalyst and generates a radical.

BACKGROUND OF THE INVENTION

It is known that ring-opened polymers are produced from cycloolefins by the use of a metathesis polymerization catalyst system. Therefore, a process has been proposed to obtain a molded polymer article by carrying out the polymerization and molding of a metathesis polymerizable cycloolefin, such as dicyclopentadiene (DCPD), in one step in a mold using a metathesis polymerization catalyst. More particularly, a process has been proposed to obtain a molded polymer article, taking advantage of the fact that a metathesis polymerization catalyst system is composed of two components consisting of a catalyst component such as tungsten chloride and an activator component such as an alkylaluminum, by using two solutions, each of which contains one of the above components and a monomer, quickly mixing the solutions and injecting the mixture into a mold (for example, U.S. Pat. No. 4,400,340).

Such processes are very attractive from an industrial viewpoint because large-sized molded articles having good mechanical properties can be produced, using an inexpensive low-pressure mold. However, it has been found with the progress of practical application that some improvements are desirable.

One of the required improvements is the reduction of residual monomers in the molded article. In general, unreacted monomers are left in a molded article produced by the simultaneous polymerization and molding of metathesis polymerizable cycloolefins. Metathesis polymer molded article frequently contains up to several percent of residual monomer. Since cycloolefins generally have a characteristic unpleasant odor, the molded article also emits the particular odor. Furthermore, the residual monomer decreases the heat-deformation temperature of the molded article by its plasticizing action.

Accordingly, the reduction of the amount of residual monomer has become important from the viewpoint of widening the application field of the product.

U.S. Pat. No. 4,481,344 discloses that hydrocarbon compounds having a trihalogenated carbon group and hydrocarbon compounds having a halogen atom activated by a double bond at β-position can be used as a residual monomer reducing agents. The inventors of the present invention have also found, independently, that carboxylic acid halides, carboxylic acid anhydrides, silicon halides and phosphorus halides also have residual monomer reducing effects.

As a result of intensive investigation on the mechanism of the effect of the above compounds to reduce the residual monomer content, the following facts have been found.

The transition metal element forming the catalyst of a metathesis polymerization catalyst system is generally used in the state of its highest atomic valence. However, the element is reduced by the action of an activator to a state of lower atomic valence. This reduction can be observed, for example, by the fading of the dark red purple color of a catalyst based on tungsten hexachloride to an extremely light color upon mixing with an alkylaluminum-based activator.

When the system contains a halogenated compound, e.g. as taught by U.S. Pat. No. 4,481,344, it is believed that a redox system is formed between that compound and the reduced transition metal to cause the oxidation of the transition metal back to its original valence, and the reduction of the halogenated compound into a halide anion and a residue remaining in the form of a radical formed by the extraction of halogen. This reaction can be observed also by the fact that the red purple color of a molded polymer article is intensified as compared with a molded article lacking the halogenated compound.

There are at least two possible explanations for the reduction of residual monomers by the redox reaction. One of the explanations is the activation of the metathesis polymerization capability of the reoxidized transition metal. Another possible explanation is that the radical produced by reduction of the halogenated compound decreases the remaining monomer by radical polymerization of the cycloolefin. The correct explanation has not been clearly confirmed.

For the further clarification of the mechanism, tungsten hexachloride was solubilized by complexing with a phenolic compound. The solubilized tungsten hexachloride and an amount of dichlorodiphenylmethane equivalent to that used as a typical monomer-reducing agent according to U.S. Pat. No. 4,481,344 were added to methyl methacrylate and heated. No radical polymerization was observed. On the contrary, when tungsten pentachloride solubilized in the same manner was heated in methyl methacrylate together with dichlorodiphenylmethane of an amount equivalent to the tungsten content of the solubilized tungsten chloride, the methyl methacrylate was polymerized.

SUMMARY OF THE INVENTION

The inventors of the present invention have conceived the idea, from the above confirmed facts, that, if a radically polymerizable monomer is included with a metathesis polymerizable monomer in the presence of a residual monomer reducing agent, radical polymerization will take place simultaneously with metathesis polymerization to form an IPN containing both polymers.

It has been also clarified that a radically polymerizable vinyl monomer can participate in the metathesis polymerization reaction and act as a chain-transfer agent depending on the structure of the vinyl monomer. Thus, a monomer having a second double bond conjugated with the vinyl group and which is free of active hydrogen should be used to avoid the above problem. Moreover, the conjugated vinyl monomer is also preferably because the radical polymerization property is improved by the conjugate stabilization effect.

The present invention is a process for producing a molded polymer article by the simultaneous polymerization and molding of a monomer mixture comprised of a metathesis polymerizable cycloolefin monomer and a radically polymerizable vinyl monomer in the presence of a transition metal-based metathesis polymerization catalyst system characterized in that (a) the monomer mixture also contains a compound capable of generating a radical by redox reaction with a reduced transition metal compound;

(b) at least a portion of the transition metal catalyst component is in a valence state at least one less than its maximum valence and;

(c) the vinyl monomer is free of active hydrogen and contains a second double bond conjugated with the vinyl group.

DETAILED DESCRIPTION OF THE INVENTION

Preferred examples of the metathesis polymerizable cycloolefin monomer used in the present invention are those containing one or two norbornene structures having high metathesis polymerizability, for example, dicyclopentadiene, tricyclopentadiene, cyclopentadiene-methylcyclopentadiene codimer, 5-ethyl-idenenorbornene, norbornene, norbornadiene, 5-cyclohexenylnorbornene, 1,4,5,8-dimethano-1,4,4a,5,6,7,8,8,8a-octahydronaphthalene, 1,4-methano-1,4,4a5,6,7,8,8,8a-octahydronaphthalene, 6-ethyldiene-1,4,5,8-dimethano-1,4,4a,5,6,7,8,8a-heptahydronaphthalene, 1,4,5,8-dimethano-1,4,4a,5,8,8a-hexahydronaphthalene, ethylene-bis(5-norbornene), or mixtures of such monomers. Dicyclopentadiene or a monomer mixture composed mainly of dicyclopentadiene is especially preferred.

Other metathesis polymerizable cyclic compounds having a norbornene structure and containing a polar hetero atom such as oxygen, or nitrogen may be used as required. The polar group is preferably ester group, ether group, cyano group or N-substituted imido group can also be employed. Such polar monomers are generally used in combination with dicyclopentadiene.

Examples of the copolymerizing monomer include 5-methoxycarbonylnorbornene, 5-(2-ethylhexyloxy)-carbonyl-5-methylnorbornene, 5-phenyloxymethylnorbornene, 5-cyanonorbornene, 6-cyano-1,4,5,8-dimethano-1,4,4a,5,6,7,8,8a-octahydronaphthalene, N-butyl-nadic acid imide and the like.

It is required that the above-mentioned metathesis polymerizable monomers be those containing the lowest possible amount of impurities which inactivate the metathesis polymerization catalyst.

As the transition metal-based catalyst component of the metathesis polymerization catalyst system used in the present invention are used salts such as e.g. halides of tungsten, rhenium, tantalum, and molybdenum and, especially, tungsten compounds. Among tungsten compounds are preferred tungsten halides, and tungsten oxyhalides. More particularly, tungsten hexachloride and tungsten oxychloride are preferred. Organoammonium tungstate and molybdate may be used as well. The tungsten halide compounds undesirably initiate cationic polymerization immediately when added directly to the monomer. It is, therefore, preferable that the tungsten compounds be previously suspended in an inert solvent such as benzene, toluene or chlorobenzene and solubilized by the addition of a small amount of an alcoholic compound or a phenolic compound and inactivated as cationic initiators. A Lewis base or a chelating agent is preferably added to the catalyst in an amount of about 1–5 mol per 1 mol of the tungsten compound in order to prevent undesirable cationic polymerization. Those additives may include acetylacetone, acetoacetic acid alkyl esters, tetrahydrofuran, benzonitrile and the like. Some of the forecited polar monomers are, themselves, Lewis bases and exhibit the above cationic initiation action without addition of the compounds cited above.

The monomer solution (solution A) containing the Lewis base or chelating agent-treated catalyst component has sufficiently high stability for practical use.

The activator components of the metathesis polymerization catalyst system include organometallic compounds chiefly comprising alkylated compounds of metals of group I-group III in the periodic table, preferably, alkyltin compounds, alkylaluminum compounds, alkylaluminum halide compounds and the like such as diethylaluminum chloride, ethylaluminum dichloride, trioctylaluminum, dioctylaluminum iodide, tributyltin hydride and the like. The organometallic compound used as the activator component is dissolved in the monomer to form the other reactive solution (referred to as the solution B).

According to the present invention, the molded polymer articles are produced by mixing the solution A with the solution B. The polymerization reaction, however, starts very rapidly when the above-mentioned composition is used and, consequently, undesirable initiation of hardening often occurs before the mold is completely filled with the mixed solution. In order to overcome this problem, it is preferable to use a polymerization moderating agent as mentioned above.

As such moderators are generally used Lewis bases, particularly, ethers, esters, and nitriles. Examples of the moderators include e.g. ethyl benzoate, butyl ether, and diglyme. Such moderators are generally added to the solution of the activator component comprising an organometallic compound. When a monomer having a Lewis base group is used in the reactive solution, as e.g. the polar monomers mentioned above, the monomer may be used to play the role of the moderator.

As mentioned above, the compounds capable of generating a radical by the redox reaction with a reduced transition metal compound include (i) compounds having a trihalogenated carbon group;
(ii) hydrocarbon compounds having a halogen atom activated by a double bond at β-site;
(iii) carboxylic acid halides;
(iv) carboxylic acid anhydrides;
(v) halogenosilanes; and
(vi) halogenated phosphorus compounds Examples corresponding to (i) include, for example, ethyl trichloroacetate, trichlorotoluene and hexachloro-p- or -m-xylene. The compounds corresponding to (ii) include e.g. dichlorodiphenylmethane, bis-p-(dichlorobenzyl)benzene, benzyl chloride, and benzal chloride.

Examples of (iii) are tere- or isophthaloyl chloride and benzoyl chloride and an example of (iv) is benzoic anhydride. Trichlorophenylsilane and dichlorodiphenylsilane are examples of (v) and phosphorus oxychloride is an example of (vi).

Especially preferably compounds are hexachloro-p- or -m-xylene, trichlorotoluene, and dichlorodiphenylmethane.

The vinyl monomer used in the present invention must not be active as a chain-transfer agent during the metathesis polymerization reaction as mentioned above. From this point of view, it is a vinyl monomer having conjugated double bonds. The vinyl monomer includes a monomer having similar polymerizability such as a compound having vinylidene group, vinylene group, etc., as well as the vinyl group in a narrow sense.

The monomer belonging to the above category is further required to be free from polar group containing active hydrogen which would also inhibit the metathesis polymerization.

Furthermore, the monomer must be soluble in a metathesis polymerizable monomer or another vinyl monomer to be used in combination with it and must be capable of forming a liquid mixture with the comonomer even if the monomer is solid at normal temperature. The volatility of the monomer is preferably not high at normal temperature.

Examples of the vinyl monomer are a group of styrene monomers such as e.g. styrene, α-methylstyrene, vinyltoluene, divinylbenzene, vinylnaphthalene, divinylnaphthalene, divinylbiphenyl, monochlorostyrene, dichlorostyrene, monobromostyrene, dibromostyrene, and tribromostyrene. Styrene, vinyltoluene, divinylbenzene, and dibromostyrene are especially preferable from the viewpoint of industrial availability.

The vinyl monomer further includes esters of acrylic acid and methacrylic acid. Concrete example of the compounds are acrylic acid or methacrylic acid esters of a monoalcohol having a carbon number of 20 or less or its halogen-substituted compound such as methyl methacrylate, methyl acrylate, ethyl methacrylate, ethyl acrylate, propyl methacrylate, propyl acrylate, 2,3-dibromopropyl acrylate, 2,3-dibromopropyl methacrylate, butyl methacrylate, butyl acrylate, tribromoneopentyl acrylate, tribromoneopentyl methacrylate, hexyl methacrylate, hexyl acrylate, octyl methacrylate, octyl acrylate and the like; polyacrylate or methacrylate of a polyol having 2-6 hydroxyl groups or its halogen-substituted compound such as ethylene diacrylate, ethylene dimethacrylate, butylene diacrylate, butylene dimethacrylate, diethylene glycol diacrylate, diethylene glycol dimethacrylate, trimethylolpropane triacrylate, trimethylolpropane trimethacrylate, dibromoneopentyl glycol diacrylate, dibromoneopentyl glycol dimethacrylate, pentaerythritol tetraacrylate, and pentaerythritol tetramethacrylate; and aryl or aralkyl esters of acrylic acid or methacrylic acid or their halogen-substituted compounds such as phenyl acrylate, phenyl methacrylate, tribromophenyl acrylate, tribromophenyl methacrylate, benzyl acrylate, benzyl methacrylate, m-phenylene bisacrylate and m-phenylene bismethacrylate.

Diesters of maleic acid and fumaric acid may be used also as the above monomers. Since these monomers are not readily homopolymerizable, they are employed as comonomers with other monomers, the amount of addition of these monomers being determined taking consideration of their copolymerizability with the other monomer being employed.

Examples of such monomers are dimethyl maleate, dimethyl fumarate, diethyl maleate, diethyl fumarate, dipropyl maleate, bis(dibromopropyl) maleate, dibutyl maleate, dihexyl maleate, dioctyl maleate, bis(tribromoneopentyl) maleate, diphenyl maleate, and bis(nonylphenyl) maleate, diphenyl maleate, and bis(nonylphenyl) maleate.

Conjugated dienes such as e.g. butadiene, isoprene, cyclopentadiene, and piperylene can be used as the radically polymerizable vinyl monomer. However, these conjugated dienes present various problems in use such as e.g. low boiling points such that they exist in gaseous state at normal temperature or they lack stability and undergo dimerization by Diels-Alder reaction. Accordingly, most of these compounds are difficult to use.

The vinyl monomer further includes a group of compounds containing at least one metathesis polymerizable group and at least one radically polymerizable group in the same molecule. Preferably, the metathesis polymerizable group of these monomers (IV) is the norbornene group and the radically polymerizable group is the above-mentioned styryl group, acrylate group, or methacrylate group. Examples of such compounds are 5-(styryl)norbornene

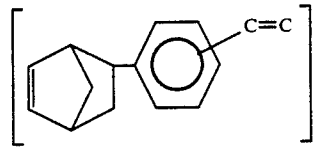

produced by norbornylating a vinyl group of divinylbenzene with cyclopentadiene by Diels-Alder reaction; an acrylate, a methacrylate, a maleate or a fumarate containing norbornene group such as 5-(acryloyl methyl)norbornene

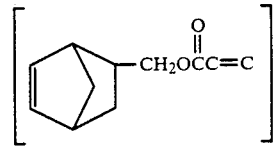

5-(methacryloyl methyl)norbornene

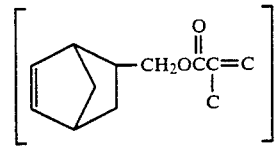

bis(norbornenyl methyl)maleate

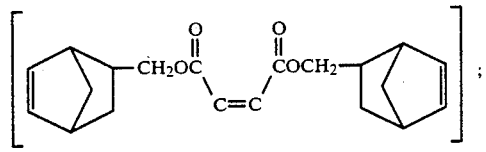

and a compound produced by norbornylating a part of polyol polyacrylate or methacrylate with cyclopentadiene, for example, ethylene monoacrylate (norbornenecarboxylate)

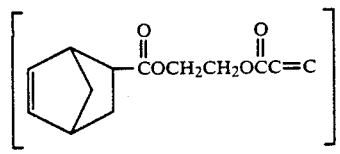

Styrene-type monomers having low polarity are preferable among the above vinyl monomers from the viewpoint of compatibility with metathesis polymerization.

These compounds can be added without causing considerable influence on the progress of metathesis polymerization and are effective in promoting the polymerization. However, it is difficult to obtain IPN's having a wide variety of properties because the selectable range of the monomer structures is narrow.

On the contrary, acrylates, methacrylates, maleates and fumarates have polar ester groups to influence the progress of metathesis polymerization and show a tendency to retard the progress of the polymerization reaction. However, these compounds are advantageous for the production of an IPN having a variety of desired properties because of an extremely wide selection of monomers as shown by examples.

Monomers having a metathesis polymerizable group as well as a radically polymerizable group are preferably used in general in combination with other vinyl monomers because these monomers can serve as crosslinking agents.

The molar ratio of the vinyl monomer to the metathesis polymerizable cycloolefin monomer used in the reaction depends upon the identity of the vinyl monomer and the required properties of the molded polymer article and is generally between 1:1 and 1:0.01. The especially preferred ratio is between 1:0.3 and 1:0.05. In the case of preparing the reaction solution in the form separated into the solution A and the solution B, the vinyl monomer can be added to the solutions in equal amounts or can be added exclusively to one solution or the other depending upon what, if any, interaction takes place between the vinyl monomer and the components of the catalyst system.

When a tungsten compound is used as the catalyst component, the ratio of the metathesis polymerization catalyst system to the cycloolefin monomer is about 500:1-15000:1, and preferably about 1000:1-3000:1 on molar base. When an alkylaluminum compound is used as the activator component, the ratio of the aluminum compound to the above-mentioned cycloolefin monomer is about 100:1-2000:1 and preferably around a ratio of about 200:1-1000:1 on molar base.

The compound capable of generating a radical by a redox reaction with the reduced transition metal of the catalyst system can be present in an amount equivalent on a molar basis to the transition metal. However, the amount is practically and preferably 0.5-5 molar equivalents, more preferably 0.75-3 molar equivalents based on the transition metal element to account for variations of probability and reaction rate.

In the practical radical polymerization, another additional radical initiator can be added to the system when the formation of radical initiator by the above redox reaction cannot be raised to a sufficient level under the reaction conditions by the reduced transition metal.

A variety of additives may be used in the molded polymer article of the present invention to improve or to maintain characteristics of the molded articles. The additives include fillers, pigments, antioxidants, light stabilizers, flame retardants, plasticizers, macromolecular modifiers and the like. These additives must be added to the starting solutions, since they cannot be added after the solutions are polymerized to form a molded polymer article.

They may be added to either one or both of the solution A and the solution B. The additives should be those which are substantially unreactive with the catalyst system such as the highly reactive catalyst component and activator component, the radical-generating compound, the metathesis polymerizable cycloolefin monomer and the radically polymerizable vinyl monomer in the solutions and must have no inhibitory action on the polymerization. If the reaction with the catalyst component is unavoidable but does not essentially inhibit the polymerization, the additives can be mixed with he monomers to prepare a third solution, and the third solution mixed with the first and/or second solutions immediately before polymerization. The mold can be filled with a solid filler before charging the reactive solutions to the mold provided that the filler forms gaps which can be filled sufficiently with reacting solution immediately before or during the polymerization reaction.

The reinforcing agents or fillers used as additives can improve flexural modulus of the polymer. These include glass fibers, mica, carbon black, wollastonite and the like.

The molded polymer article produced by the present invention will normally contain an antioxidant. Preferably, a phenolic- or amine-antioxidant is added to the solution in advance. Examples of the antioxidants include 2,6-t-butyl-p-cresol, N,N'-diphenyl-p-phenylenediamine, and tetrakis-[methylene-(3,5-di-t-butyl-4-hydroxycinnamate)]-methane.

The molded polymer articles produced by the present invention may also contain other polymers, which are added to the monomer solution. Addition of an elastomer as the polymer additive is effective in improving the impact strength of the molded articles and controlling the viscosity of the solution. Examples of the elastomers to be used for the above purpose include a wide variety of elastomers such as styrene butadiene-styrene triblock rubber, styrene-isoprene-styrene triblock rubber, polybutadiene, polyisoprene, butyl rubber, ethylene-propylene-diene terpolymer, and nitrile rubber.

As described above, the molded polymer articles of the present invention are prepared by simultaneous molding and polymerization. Such molding methods include, for example, a resin injection process comprising the mixing of a solution A and solution B in advance and the injection of the premix into a mold and a RIM process comprising the impingement mixing of the above-mentioned solution A and solution B containing divided catalyst system in a mix head and the immediate injection of the mixture into the mold. The RIM process is most commonly used.

In both the RIM process and resin injection process, the mixture can be introduced into the mold under relatively low pressure, so that an inexpensive mold is usable.

In the process for producing a molded polymer article of the present invention, the polymerization of a metathesis polymerizable cycloolefin monomer is initiated very quickly by the metathesis polymerization catalyst whereupon the temperature of the system increases. The temperature of the system sometimes reaches 190° C. or more in the case of adiabatic metathesis polymerization reaction using dicyclopentadiene as the exclusive monomer.

The transition metal of the metathesis polymerization catalyst is reduced upon initiation of the metathesis polymerization and a radical polymerization is initiated by the radical formed by the redox reaction with the radical-generating compound. Since the progress of the radical polymerization is slow compared with the metathesis polymerization, it is necessary, in some case, to maintain the temperature of the system and perform sufficient progress of the radical polymerization without quickly removing the heat of the metathesis polymerization reaction. The system temperature is maintained generally between 80° C. and 150° C. and the control of the temperature is preferably continued until the radical polymerization proceeds to the desired level.

An IPN molded article composed of a metathesis polymer and a radical polymer is produced by the above process. Such molded articles can exhibit a variety of required characteristics due to the addition of a radical polymer as compared with the molded article of simple metathesis polymer and are applicable to wider applications.

The invention described herein is illustrated in detail by the following examples. These examples are solely for explanation and do not limit the scope of the invention.

EXAMPLES 1 to 4

Comparative Examples 1 to 4

Commercially available DCP was purified by distillation in a nitrogen stream under reduced pressure to produce purified dicyclopentadiene with a freezing point of 33.4° C. The purity was determined by gas chromatography to be not less than 99%.

Styrene and ethylene bisacrylate (EBA) used in the examples were prepared by distilling commercially available chemicals. 5-Styryl-norbornene (SNB) was produced by reacting commercially available divinylbenzene with cyclopentadiene in the presence of acetonitrile and hydroquinone and separating the desired SNB compound in a purified state by distillation. 5-Hydroxy-methyl- norbornene was reacted with acryloyl chloride to obtain norbornenylmethyl acrylate (NMA), which was used after purification by distillation.

Dichlorodiphenylmethane was prepared according to a known process by reacting benzophenone with phosphorus pentachloride and was used after purification by distillation.

To prepare a catalyst concentrate, 19.80 g (0.05 mol) of high-purity tungsten hexachloride was added to 90 ml of anhydrous toluene under a nitrogen stream. To the resultant mixture was added a solution produced by dissolving 0.925 g of t-butanol in 5 ml of toluene. This was stirred for 1 hour, then a solution consisting of 11.05 g (0.05 mol) of nonylphenol and 5 ml of toluene was added and stirred for 1 more hour under nitrogen purge. 10 g of acetylacetone was added to the mixture and the mixture was purged with nitrogen under stirring overnight to remove the by-product hydrogen chloride gas. A part of the toluene distilled off from the system was replenished to obtain a 0.5M concentrated tungsten solution.

A 1.0M solution of activator was prepared by mixing 5.70 g of di-n-octyl-aluminum iodide, 31.17 g of tri-n-octylaluminum and 13.42 g of diglyme under nitrogen stream and diluting the mixture with DCP to 100 ml in total.

A concentrated solution of the catalyst system and dichlorodiphenylmethane were added in amounts shown in Table 1 to 100 grams each of monomer mixtures having the compositions also shown in Table 1. The solutions A and B were prepared by this procedure. A rod-shaped molded specimen was produced by taking 10 ml each of the solutions A and B and mixing and injecting the solutions with a miniature bench RIM machine. The softening point (by TMA) and the amounts of residual DCPD and residual monomer (IV) were determined on the obtained molded specimen. For comparison, the same properties were measured on a molded specimen prepared, without addition of dichlorodiphenylmethane, using the same reaction conditions as were used in the procedures for the preparation of the above specimens.

The specimen without dichlorodiphenylmethane contains residual radically polymerizable monomer. Furthermore, it contains a large amount of residual DCPD and has very low softening point determined by TMA.

On the contrary, the radically polymerizable vinyl monomer was consumed by radical polymerization in the case of the specimen added with dichlorodiphenylmethane. The presence of the vinyl polymer raised the softening point and gave a useful molded article.

TABLE 1

| | Composition of Reactive Solutions | | | | | | | |
|---|---|---|---|---|---|---|---|---|
| | Example 1 | | Example 2 | | Example 3 | | Example 4 | |
| Monomer Composition of Solution A (mol %) | DCP Styrene | 80 20 | DCP SNB | 80 20 | DCP EBA | 90 10 | DCP NMA | 80 20 |
| Addition Amount of Concentrated Main Catalyst Solution (g) | 1.2 | | 1.42 | | 1.42 | | 2.0 | |
| Addition Amount of Dichlorodiphenylmethane (g) | 0.14 | | 0.17 | | 0.17 | | 0.24 | |
| Monomer Composition of Solution B (mol %) | DCP | 100 | DCP | 100 | DCP | 100 | DCP | 100 |
| Addition Amount of Concentrated Activator Solution (g) | 2.9 | | 2.56 | | 2.56 | | 1.8 | |

TABLE 2

| | Properties of Polymer Molded Articles | | | | | | | |
|---|---|---|---|---|---|---|---|---|
| | Example 1 | Comparative Example 1 | Example 2 | Comparative Example 2 | Example 3 | Comparative Example 3 | Example 4 | Comparative Example 4 |
| Softening Point (°C.) (TMA) | 97 | 60 | 135 | 80 | 112 | 88 | 135 | 94 |
| Residual DCP (wt. % polymer) | 0.7 | 16.9 | 1.2 | 8.5 | 0.6 | 1.8 | 0.2 | 1.1 |
| Residual Monomer (IV) (wt. % polymer) | Styrene 0.05 | Styrene 8.5 | SNB 0.1 | SNB 0.1 | EBA 1.0 | EBA 2.0 | NMA 0.3 | NMA 1.1 |

We claim:

1. A process for producing a molded polymer article by polymerizing and molding a monomer mixture comprised of a metathesis polymerizable monomer and a radically polymerizable vinyl monomer wherein metathesis and radical polymerization proceed simultaneously in the presence of a transition metal-based metathesis polymerization catalyst system characterized in that
   (a) the monomer mixture under the conditions of the reaction generates a radical by a redox reaction with a reduced transition metal compound;
   (b) at least a portion of the transition metal catalyst component is in a valence state at least one less than its maximum valence and;
   (c) the vinyl monomer is free of a polar group containing active hydrogen and contains a second double bond conjugated with the vinyl group.

2. The process according to claim 1 wherein the metathesis polymerization catalyst system comprises a catalyst component and an activator component which are prepared as separate solutions in cycloolefin monomer and combined prior to charging to a mold wherein polymerization and molding take place simultaneously and wherein the radically polymerizable vinyl monomer and the compound capable of creating a radical by redox reaction are present in either or both solutions and the reduced transition metal catalyst is generated upon mixing of the separate solutions.

3. The process of claim 2 wherein the compound capable of generating a radical by a redox reaction with the reduced transition metal of the catalyst system is present in an amount equal to about 0.5 to 5 molar equivalents based on the transition metal.

4. The process of claim 2 wherein the compound capable of generating a radical by a redox reaction with a reduced transition metal compound is selected from the group consisting of
   (i) compounds having a trihalogenated carbon group;
   (ii) hydrocarbon compounds having a halogen atom activated by a double bond at the B site;
   (iii) carboxylic acid halides;
   (iv) carboxylic acid anhydrides;
   (v) halogenosilanes; and
   (vi) halogenated phosphorus compounds 5. The process of claim 4 wherein the compound capable of generating a radical by a redox reaction with the reduced transition metal of the catalyst system is present in an amount equal to about 0.5 to 5 molar equivalents based on the transition metal.

6. The process of claim 4 wherein the compound capable of generating a radical by a redox reaction with the reduced transition metal of the catalyst system is present in an amount equal to about 0.75 to 3 molar equivalents based on the transition metal.

7. The process of claim 4 wherein the compound capable of generating a radical by a redox reaction with the reduced transition metal of the catalyst system is present in an amount equal to about 0.5 to 5 equimolar amount based on the transition metal.

8. The process of claim 4 wherein the transition metal compound is a halide of tungsten, rhenium, tantalum or molybdenum.

9. The process of claim 8 wherein the transition metal compound is tungsten hexachloride or tungsten oxytetrachloride.

10. The process of claim 9 wherein the compound capable of generating a radical by a redox reaction with the reduced transition metal of the catalyst system is present in an amount equal to about 0.5 to 5 molar equivalents based on the transition metal.

11. The process of claim 9 wherein the compound capable of generating a radical by a redox reaction with the reduced transition metal of the catalyst system is present in an amount equal to about 0.75 to 3 molar equivalents based on the transition metal.

12. The process of claim 9 wherein the compound capable of generating a radical by a redox reaction with the reduced transition metal of the catalyst system is present in an amount equal to about 0.5 to 5 equimolar amount based on the transition metal.

13. The process of claim 4 wherein the metathesis polymerizable cycloolefin monomer comprises dicyclopentadiene.

14. The process of claim 4 wherein the vinyl monomer comprises a styrene, an acrylate, a methacrylate or a compound having such a group and a norbornene group in the same molecule.

15. The process of claim 13 wherein the cycloolefin monomer and the vinyl monomer are present in a molar ratio of about 1:1 to about 1.0:0.1.

16. The process of claim 14 wherein the cycloolefin monomer and the vinyl monomer are present in a molar ratio of about 1:1 to 1.0:0.1.

17. In a process for preparing a molded polymer article wherein a plurality of liquid streams, one of which contains the catalyst component of a metathesis catalyst system and another of which contains the activator component of a metathesis catalyst system and at least one of which contains a metathesis polymerizable cycloolefin are combined and transferred to a mold wherein polymerization and molding take place simultaneously, the improvement which comprises at least one of such streams containing a radically polymerizable vinyl monomer free of active hydrogen and having a second double bond conjugated with its vinyl group and at least one of such streams containing a compound capable of generating a radical by a redox reaction with a reduced transition metal compound.

18. A process according to claim 17 wherein the metathesis polymerizable cycloolefin comprises dicyclopentadiene.

19. A process according to claim 18 wherein the compound capable of generating a radical is selected from the class consisting of
   (i) compounds having a trihalogenated carbon group;
   (ii) hydrocarbon compounds having a halogen atom activated by a double bond at -site;
   (iii) carboxylic acid halides;
   (iv) carboxylic acid anhydrides;
   (v) halogenosilanes; and
   (vi) halogenated phosphorus compounds.

20. A process according to claim 19 wherein the metathesis polymerization component is a tungsten halide.

21. A process according to claim 19 wherein the vinyl monomer is an alkyl acrylate or an alkyl methacrylate.

22. A process according to claim 19 wherein the vinyl compound is styrene or a styrene derivative.

23. A process according to claim 21 wherein the compound capable of forming a radical is dichlorodiphenylmethane.

24. A process according to claim 22 wherein the compound capable of forming a radical is dichlorodiphenylmethane.

25. A process according to claim 20 wherein the vinyl monomer is an alkyl acrylate.

26. A process according to claim 20 wherein the vinyl monomer is styrene.

27. A process wherein a compound according to claim 25 wherein the compound capable of forming a radical is dichlorodiphenylmethane.

28. A process wherein a compound according to claim 26 wherein the compound capable of forming a radical is dichlorodiphenylmethane.

* * * * *

UNITED STATES PATENT AND TRADEMARK OFFICE
CERTIFICATE OF CORRECTION

PATENT NO. : 5,015,710

DATED : May 14, 1991

INVENTOR(S) : Zenichiro Endo and Shigeyoshi Hara

It is certified that error appears in the above-identified patent and that said Letters Patent is hereby corrected as shown below:

In the Claims, Claim 19, Col. 12, line 49,
" -site" should read -- the $\beta$ site --.

Signed and Sealed this

Thirteenth Day of October, 1992

Attest:

DOUGLAS B. COMER

*Attesting Officer*     *Acting Commissioner of Patents and Trademarks*